B. F. MUSCHERT.
Cultivators.

No. 140,724. Patented July 8, 1873.

Witnesses.
J. S. Singer
John K. Rupertus

Benjamin F. Muschert
by his Atty
Stinson and Son

UNITED STATES PATENT OFFICE.

BENJAMIN F. MUSCHERT, OF MORRISVILLE, PENNSYLVANIA.

IMPROVEMENT IN CULTIVATORS.

Specification forming part of Letters Patent No. 140,724, dated July 8, 1873; application filed December 7, 1872.

*To all whom it may concern:*

Figure 1:
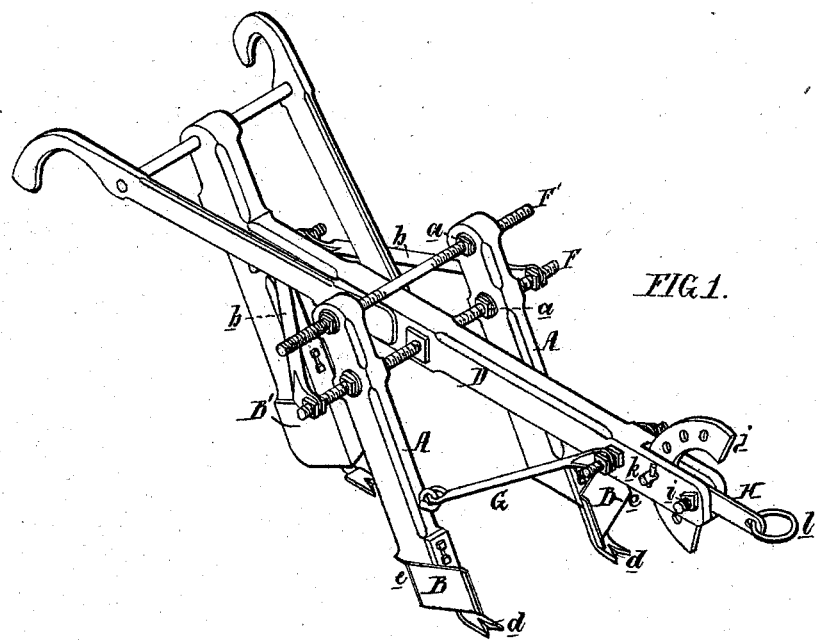
Figure 2:
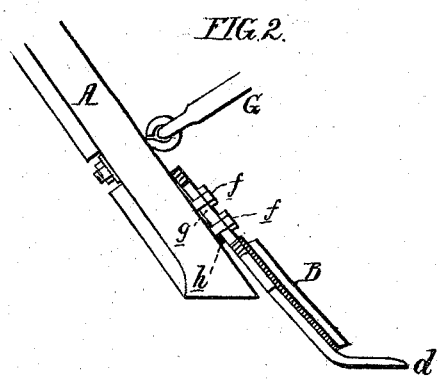
Figure 3:
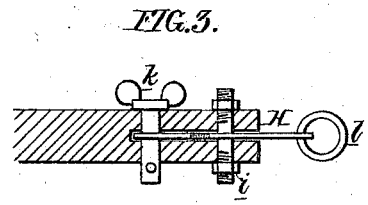

Be it known that I, BENJAMIN F. MUSCHERT, of Morrisville, Bucks county, Pennsylvania, have invented certain Improvements in Cultivators, of which the following is a specification:

The object of my invention is to enable a cultivator or cultivator-plow to be readily adjusted to different widths to accord with the distance between the rows of the growing crop to be cultivated. I accomplish this object in the manner plainly shown in the perspective view, Figure 1 of the accompanying drawing, by rendering the standards A A, to which the side teeth or plows are attached, adjustable toward and from the central beam D of the cultivator upon screw-rods F and F', which are provided with nuts $a$, arranged to be screwed tightly against the opposite sides of the said standards after the lateral adjustment of the same. The lower screw-rod F is braced by diagonal stays $b\ b$ bolted at their rear ends to the main beam D; and the strain upon the screw-rods is also reduced and the standards A prevented from turning upon the same by connecting the said standards to the central beam D by diagonal braces G, the connections with the latter being such as to enable them to accommodate themselves to different angles to accord with the extent of lateral adjustment of the standards. Each plow is connected to its standard in the manner plainly shown in the sectional view, Fig. 2, by two bolts, $f$, passing through a longitudinal slot, $g$, in the plow, the slot permitting the latter to be adjusted vertically, while the depth of penetration into the soil is regulated by raising or lowering the point of the plow by means of washers $h$ inserted between the said plow and the standard, and fitted upon one or other of the bolts $f$. The depth of penetration of the plows is also regulated by means of a lever, H, Figs. 1 and 3, pivoted to the main beam D at $i$, and to which the draft animals are attached. This lever has at its rear end a segmental projection, $j$, through any one of a number of holes in which a pin, $k$, in the main beam can be passed, in order to retain the front end of the said lever in either an elevated or depressed position.

The advantage of this arrangement is that the required adjustments can be effected readily, and without detaching the ring or clevis $l$ to which the draft-chain is connected.

I claim as my invention—

The combination, with the rods F F' and their adjusting-nuts and standards, of the rigid braces $b\ b$ and the beam D, as specified.

In testimony whereof I have signed my name to this specification in the presence of two subscribing witnesses.

BENJAMIN F. MUSCHERT.

Witnesses:
ROBERT B. DUNGAN,
ROBERT BELL.